UNITED STATES PATENT OFFICE.

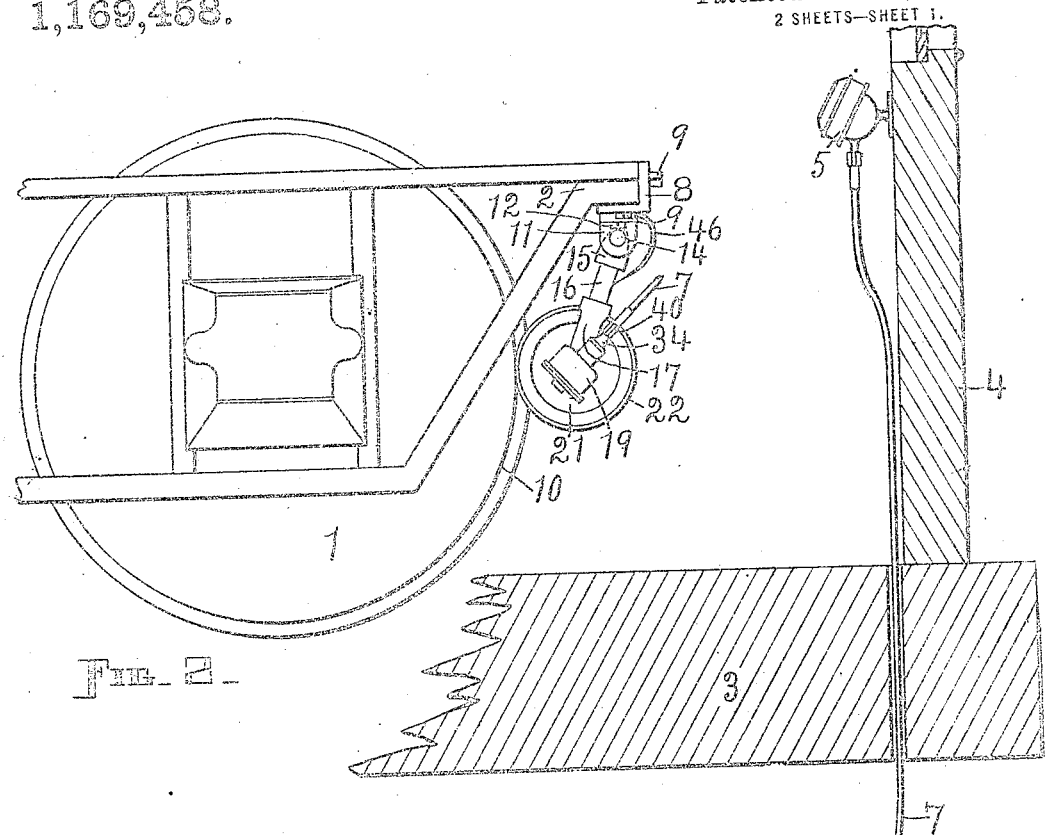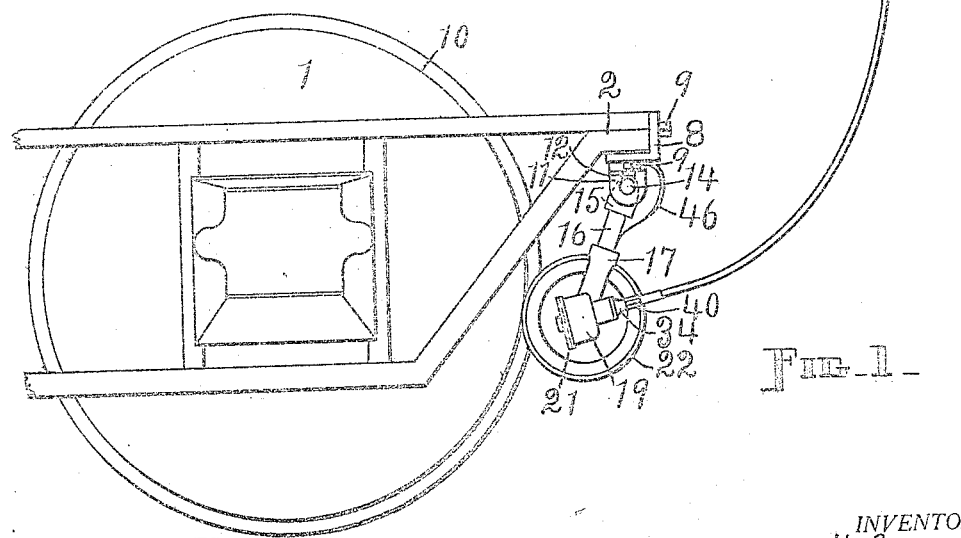

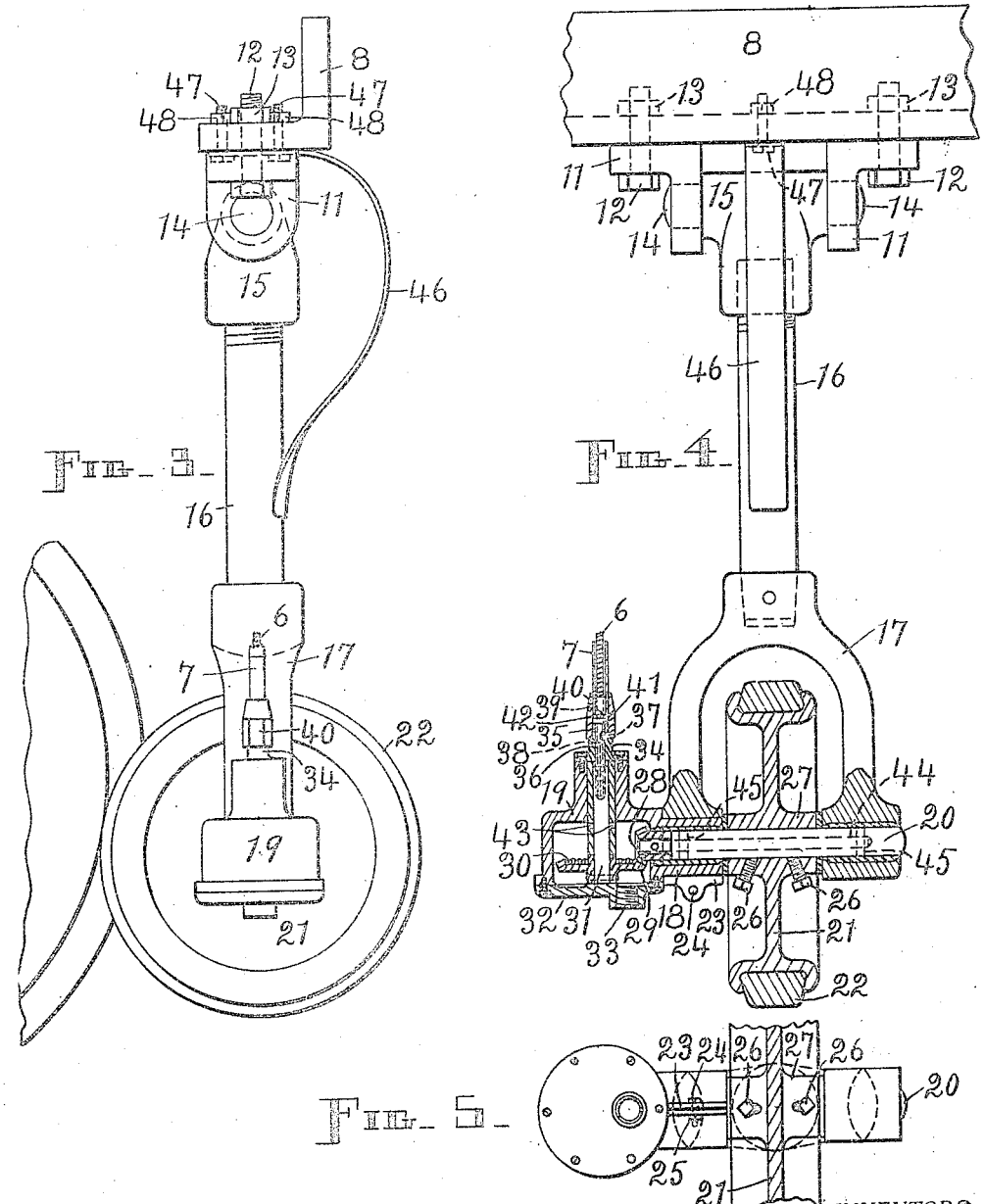

JAMES H. BULLARD AND EDWIN W. BULLARD, OF SPRINGFIELD, MASSACHUSETTS; FREDERICK H. BULLARD AND EDWIN W. BULLARD, EXECUTORS OF SAID JAMES H. BULLARD, DECEASED; SAID EXECUTORS AND SAID EDWIN W. BULLARD ASSIGNORS TO ALLEN WEBSTER, OF SPRINGFIELD, MASSACHUSETTS.

TRANSMISSION FOR SPEED-INDICATORS.

1,169,458. Specification of Letters Patent. Patented Jan. 25, 1916.

Application filed January 2, 1909. Serial No. 470,321.

*To all whom it may concern:*

Be it known that we, JAMES H. BULLARD and EDWIN W. BULLARD, both citizens of the United States of America, and residents of Springfield, in the county of Hampden and State of Massachusetts, have jointly invented new and useful Transmission for Speed-Indicators, of which the following is a specification.

Our invention relates to mechanism for transmitting motion from the periphery of a wheel of a track vehicle, such as a steam or electric car, to an instrument carried by such vehicle and adapted to record or indicate the speed as transmitted from said wheel.

Our invention consists in the employment of means whereby the travel of the periphery of the tread portion of a car wheel constantly varying in diameter may be transmitted to an indicator in such manner that the desired results are attained as well as in mechanism for accomplishing the result, and also in providing a construction and arrangement wherein the jar and wear and consequent danger of derangement and inaccuracy when employed on high speed heavy vehicles may be as light as possible, and to a large extent overcome.

One embodiment of our invention is herein described in detail and shown in the accompanying drawings.

Heretofore all attempts to transmit accurately the speed of a track vehicle from a wheel of such vehicle to a register carried by the latter have proved futile to a greater or less extent, owing to the fact that the treads of the wheels of such vehicles are constantly wearing away and wearing away irregularly so that they have to be trued from time to time by turning or grinding, wherefore their diameters are constantly changing and the rate of speed which they are capable of recording fluctuates to a degree sufficient to seriously impair the accuracy of the same when transmitted in any other way than that herein set forth, and the object of our invention is to overcome this difficulty by providing mechanism which records the speed of the vehicle to which it is applied with accuracy. We are able to do this because our mechanism is so constructed that it receives its motion from the periphery or tread of the wheel, rather than from the unchanging flange or side of the wheel, or from the axle, in either of which latter events an inaccuracy would result because the actual mileage would not then be recorded or registered by the number of revolutions of the wheel which would be greater to the mile as the diameter of the wheel became less; that is to say, mechanism driven either directly or indirectly from or by a car wheel, except from its varying periphery, when set to register accurately when said wheel is of the maximum size, would over-register as the wheel decreased in size.

Other objects of the invention are to provide a comparatively simple transmission, of the class designated above, that can be readily fitted to any car, is adjustable, and has great wearing qualities, this last being due to the provision made for a contact with the tread or periphery of a wheel at or adjacent to its horizontal diameter, since it is here that the contact produces the least amount of injurious vibration or oscillation, as affecting the transmission, as the car trucks play up and down on their supporting springs independently of the sustaining axles and wheels.

As the tread of a wheel is always comparatively clean, by reason of its contact with the rail and brake, contact with the tread of a wheel rather than with a rail, which latter is sometimes muddy, is much to be preferred and lends additional advantage to our transmission over one which is applied to a rail. A rail is often covered with foreign matter and is seldom as clean as a wheel tread for any length of time.

We attain the objects and secure the advantages above pointed out by the mechanism illustrated in the accompanying drawings, in which—

Figure 1 is a side view of our transmission showing it applied to a car, one wheel and part of a truck therefor, of the car, appearing in elevation, and portions of the floor or platform above such truck and the end which rises from said platform, of said car, appearing in section; Fig. 2, a side elevation of a car wheel and part of its truck with our mechanism operatively connected therewith but a little differently arranged from the mechanism shown in the preceding view; Fig. 3, an enlarged, side elevation of the transmission; Fig. 4, an enlarged front elevation and partial section of said transmission, and Fig. 5, a view of the underside of the same, the major portion of the roller being broken away.

Similar reference numerals indicate similar parts throughout the several views.

Although we have shown the hanger of our transmission suspended from the front end of a car truck, there is no reason other than that of expediency or convenience why such hanger should not be supported from some other point, and it might be arranged in an inverted position if a suitable support for its pivotal terminal could be found.

In each of Figs. 1 and 2, a car wheel is represented at 1, and a part of a truck therefor at 2, and in addition to these members there are shown in section, in Fig. 1, a portion of a car platform at 3, and a portion of the front end of the car at 4, all of which are old. Fastened on the inside of the front end 4 is a speed-indicator 5. The platform 3 is over the truck 2 which supports it, although the intermediate supporting members do not appear in the illustration. A flexible-shaft, a portion of which appears at 6 in Figs. 3 and 4, connects the speed-indicator 5 with the mechanism which is suspended from the truck 2, such shaft being incased in the usual sheath 7 which extends between said indicator and said mechanism.

An angle-iron 8 extends across the front end of the truck 2 at the top and is securely fastened thereto at each end by bolts 9—9, and our hanger is pivotally attached to said angle-iron, in front of the periphery or tread 10 of the wheel 1, by means of two brackets 11, secured to the angle-iron by bolts 12—12 and nuts 13—13, and two trunnions 14 on a socket 15, such trunnions having their bearings in depending parts of said brackets. The arrangement of the members is such that the pivotal axis of the socket 15 is parallel with the angle-iron 8, consequently the movement of the aforesaid hanger is toward and away from the tread 10 of the wheel 1. The other members of the hanger are a tube 16 and a yoke 17. The upper end of the tube 16 is screwed into or otherwise affixed to the socket 15, and the lower end of said tube has the yoke 17 pinned or otherwise secured thereto. By using a longer or shorter tube 16 the length of the hanger can be changed accordingly; thus any desired length is readily attainable and adjustment in this particular easily effected.

The lower ends of the yoke 17 respectively afford bearings for a sleeve 18 of a gear-case 19 and for one terminal of a shaft 20, the other terminal of said shaft being journaled in said sleeve. Tight on the shaft 20, between the aforesaid lower ends of the yoke 17, is a wheel or roller 21, provided in the present case with a tire 22 of fiber, or other suitable material. The end of the yoke that receives the gear-case sleeve 18 is split at 23, and a bolt 24 and nut 25 are employed in the usual manner to tighten such split part or bearing of said yoke on said sleeve, after the gear-case 19 has been properly adjusted to accommodate it to the flexible-shaft 6 and its sheath 7. The roller 21 is secured to the shaft 20, in this instance by means of two bolts 26 which are tapped into the hub, 27, of said wheel and pass through such hub into engagement with said shaft. The inner end of the shaft 20 is made smaller in diameter than the rest of the shaft, as shown at 28, and pinned or otherwise secured to this end of said shaft is a bevel-gear 29. The bevel-gear 29 is in the gear-case 19 as is also a bevel-gear 30, the former gear being smaller than the latter. The bevel-gears 29 and 30 are in mesh.

The bevel-gear 30 is pinned or otherwise secured to a spindle 31 which is suitably journaled in the gear-case 19 and is always at right-angles to the shaft 20, regardless of the position of said case. Fastened to the bottom of the gear-case is a cap 32 which has an opening 33 therein for a compression oil-cup (not shown), and fastened on the upper end of said case, which upper end is somewhat smaller in diameter than the major portion of the case, is a cap 34 which has an externally screw-threaded nipple 35. One end of the flexible-shaft 6 is rotatably connected with the spindle 31 through the medium of a sleeve 36 rigidly attached to said spindle and having an interior feather or projection 37 to enter a longitudinal slot or key-way 38 in a plug 39 which forms a part of said flexible-shaft, and the corresponding end of the sheath 7 is attached to the gear-case through the medium of a nut 40 which is fastened to said sheath and screwed on to the nipple 35; there is also a flange 41, on said plug, which is engaged by a shoulder 42 inside of said nut to prevent the flexible-shaft from becoming disconnected from said spindle; these parts constitute an adaptation of an old and well-known means of connection for flexible shafts to our transmission.

The bearings for the spindle 31 and the shaft 20 are lubricated with oil from the interior of the gear-case 19 which finds its way to such bearings through openings 43 in the spindle bearing to the interior of such bearing and through passages 44 and 45 in said shaft to the shaft bearings.

The axis of the roller 21 is parallel with the axis of the socket 15 and with the axis of the car wheel 1, wherefore said roller is adapted to be driven by said wheel when the tire 22 is caused to contact more or less forcibly with the tread 10. This forcible contact is preferably produced by means of a spring, and in this case is brought about through the medium of a bow spring 46 which is fastened at the top against the inside of the angle-iron 8, by means of bolts 47—47 and nuts 48—48, and has its lower terminal in contact with the tube 16. The spring 46 bears on the front of the hanger and so causes the hanger to swing backward or to have a tendency so to do, and thus indirectly tensions the roller 21 toward the wheel 1 with the tire 22 pressed against the tread 10.

The tube 16 should be of the proper length to so position the roller 21 that it contacts with the wheel 1 at or near the horizontal center of the same. This is done in order to reduce to the minimum the amount of pivotal play on the part of the hanger produced by the up and down motion or vibration of the truck 2, it being clearly apparent that there would be a great amount of such play if the contact between the car wheel and the transmission roller were at any considerable distance above or below the aforesaid horizontal center of said wheel. By thus contacting with the car wheel at a point which is approximately farthest from the center of said wheel in a line at right-angles to the vibratory movement of the truck, and which is therefore in a vertical line that is approximately tangent to the periphery of the wheel, the transmission roller rides on said periphery without being affected to any great extent by such vibratory movement, as stated above in slightly different terms, and there is in consequence very little wear of the hanger bearing parts, so that the life of these parts is prolonged indefinitely. In practice, this has been found to be a matter of great importance, so much so, in fact, that no other arrangement is practical because of the rapid and excessive wear of the hanger bearing parts resulting therefrom.

The adjustment provided for the gear-case is a valuable feature inasmuch as we are thus able to avoid too short bends or turns in the flexible-shaft and its sheath, with the result that the former operates with more freedom and lasts longer.

In practice, after the new mechanism, provided with a tube 16 of suitable length to properly position the roller 21 as hereinbefore explained, has been attached to the truck 2, and the flexible-shaft connections have been made, not forgetting the adjustment of the gear-case 19 around the shaft 20, which is effected through the medium of the split bearing 23 and the bolt 24 and nut 25, the operation is as follows: As the car wheel 1 revolves it rotates the roller 21, which is held with its tire 22 against the tread 10 of said wheel by the spring 46 bearing against said tube above the yoke 17, said roller carries with it said shaft 20 and the bevel-gear 29 and through the medium of the latter causes the bevel-gear 30 and the spindle 31 to rotate, said spindle imparts rotary motion to the flexible-shaft 6 which is connected therewith, and said flexible-shaft in turn actuates the speed-indicator 5. Thus every foot of travel of the tread 10, which is the same as every foot that the car travels, is recorded and recorded accurately, and this is true regardless of the diameter of said tread. There can be no lost motion between the driving and driven members 1 and 21, and no over-registration, owing to the peculiar construction and arrangement of the parts which make up our transmission.

We consider the foregoing detailed description the best embodiment of our invention.

What we claim as our invention, and desire to secure by Letters Patent, is—

1. The combination of a railroad car, in which, when traveling, there is both vertical and horizontal movements as between car body and truck and as between truck and wheels, the wheels having metallic treads, a member having movement toward and from the tread of one of the wheels, a roller mounted on said member and held in yielding contact with the tread approximately at the level of the axle, an indicator on the car body and flexible driving connections between said roller and said indicator.

2. The combination of a railway car having car wheels with metallic treads and in which, when traveling, there is both vertical and horizontal movements as between car body and truck, a hanger mounted on the car body and arranged to swing toward and from the tread of one of the car wheels, means to force said hanger toward said tread, a roller supported by said hanger and bearing against said tread, a speed indicator on the car body and flexible driving means extending between said roller and said indicator.

3. In combination, a railroad car, a hanger pivotally mounted and depending adjacent the tread of one of the car wheels, a gear case mounted on the hanger, a roller supported by the hanger and arranged to bear against said face, an indicator mounted on the car body and a flexible shaft extending between the mechanism in the gear case and the indicator.

4. The combination with a railroad car, a hanger, a rotatable roller suitably supported by the hanger, a gear case supported by the hanger, said gear case being adjustable, a spring to force the hanger toward the tread of one of the car wheels, means for securing the gear case in different positions, an indicator on the car body and flexible driving means between the mechanism in the gear case and the indicator.

JAMES H. BULLARD.
EDWIN W. BULLARD.

Witnesses:
F. A. CUTTER,
A. C. FAIRBANKS.